(12) United States Patent
Pereira

(10) Patent No.: US 8,230,499 B1
(45) Date of Patent: Jul. 24, 2012

(54) DETECTING AND BLOCKING UNAUTHORIZED DOWNLOADS

(75) Inventor: Shane Pereira, Cupertino, CA (US)

(73) Assignee: Symantec Corporation, Cupertino, CA (US)

(*) Notice: Subject to any disclaimer, the term of this patent is extended or adjusted under 35 U.S.C. 154(b) by 1041 days.

(21) Appl. No.: 12/129,170

(22) Filed: May 29, 2008

(51) Int. Cl.
*G06F 21/00* (2006.01)

(52) U.S. Cl. ............... 726/22; 726/23; 726/24; 726/26; 713/188

(58) Field of Classification Search .............. 726/26, 726/22–24; 713/188
See application file for complete search history.

(56) References Cited

U.S. PATENT DOCUMENTS

| | | | |
|---|---|---|---|
| 5,974,549 A | 10/1999 | Golan | |
| 6,275,938 B1 | 8/2001 | Bond et al. | |
| 6,412,071 B1 | 6/2002 | Hollander et al. | |
| 6,973,643 B2 * | 12/2005 | Goldsmith et al. | 717/124 |
| 7,565,686 B1 | 7/2009 | Sobel et al. | |
| 7,950,057 B1 | 5/2011 | Kennedy et al. | |
| 2003/0056117 A1 | 3/2003 | Elgressy et al. | |
| 2004/0158729 A1* | 8/2004 | Szor | 713/200 |
| 2005/0188272 A1 | 8/2005 | Bodorin et al. | |
| 2007/0050848 A1 | 3/2007 | Khalid | |
| 2007/0180524 A1* | 8/2007 | Choi et al. | 726/23 |
| 2008/0016339 A1 | 1/2008 | Shukla | |
| 2008/0148399 A1 | 6/2008 | Winkler | |

OTHER PUBLICATIONS

Sandeep Bhatkar, Daniel C. DuVarney, and R. Sekar. Address obfuscation: An efficient approach to combat a broad range of memory error exploits. In USENIX Security Symposium, 2003.*
"X-Force Research & Development Newsletter," Oct. 2006, X-Force Newsletter.*
Postings of cdman83 to hype-free blog, Dec. 2006, 36 pages, [online] [Retrieved on Nov. 24, 2008] Retrieved from the Internet <URL:http://hype-free.blogspot.com/2006_12_01_archive.html>.
U.S. Appl. No. 10/121,118, Apr. 10, 2002, McCorkendale et al.
Winter-Smith, P., "Exploitation of Buffer Overflow Vulnerabilities Under Windows XP", Hitchhiker's World, Issue #8, 27 pages, [online] [Retrieved on Nov. 19, 2008] Retrieved from the Internet <URL:http://www.infosecwriters.com/hhworld/hh8/VVideChapter.txt>.
Ferrie, P., "Attacks on More Virtual Machine Emulators," Symantec Advanced Threat Research, 2007, pp. 1-17, [Online] Retrieved from the Internet<URL:http://pferrie.tripod.com/papers/attackds2.pdf>.
United States Office Action, U.S. Appl. No. 12/166,785, Aug. 23, 2011, 21 pages.
Willems, C. et al., "Toward Automated Dynamic Malware Analysis Using CWSandbox," IEEE, 2007, pp. 32-39.

* cited by examiner

*Primary Examiner* — Kambiz Zand
*Assistant Examiner* — Imhotep Durham
(74) *Attorney, Agent, or Firm* — Fenwick & West LLP

(57) ABSTRACT

A hook is set for one or more downloading functions. Subsequently, code is executed within an application process. Responsive to the executed code calling one of the hooked functions, a return address of the called function is examined. If the return address is within a heap memory area of the application process, a remedial action, such as returning an error code or displaying an alert, is taken.

15 Claims, 4 Drawing Sheets

DETECTING AND BLOCKING UNAUTHORIZED DOWNLOADS

BACKGROUND OF THE INVENTION

1. Field of the Invention

This invention pertains in general to computer security and in particular to detection and prevention of surreptitious downloads of malicious software.

2. Description of the Related Art

Modern computer systems are often susceptible to a number of different problems, problems which are exacerbated by the increasing complexity of computer systems. One such problem relates to system security. There exists a wide variety of security threats posed by malicious software—collectively referred to as "malware"—that secretly performs operations not desired by the computer user. Such operations include theft of important data (e.g. financial records), modification or destruction of system or user files, execution of "backdoor" programs, and downloading of other malicious executable files. These operations are of particular concern in the context of web browsing, since most users perform web browsing on a frequent basis and are typically not aware that such actions pose a security threat.

Unfortunately, malware proves difficult to detect. The increased incidence of polymorphic viruses and other malware has made it increasingly difficult to detect such malware using existing signature-based detection systems. Even in the case of non-polymorphic malware detectable through signature-based approaches, it takes time to analyze the malware and to formulate a signature used to detect it, and additional time before the signature is incorporated into the malware scanning software of a given user. Thus, in the case of signature-based approaches, there is a time period after the first time that a new piece of malware is first discovered, during which the malware scanning software of a given user will fail to detect the malware.

BRIEF SUMMARY

The difficulties described above are addressed by a computer, method, and computer program product that examine return addresses of functions known to be used in malware exploits to determine whether the calling code poses a security risk. Such an approach examines general malware behavior, and is thus not subject to the shortcomings of signature-based detection systems discussed above.

One embodiment of the method hooks one or more downloading functions that can be called by code executing on the computer to download data. Responsive to a hooked downloading functions being called, a return address of the called function is identified. Responsive to determining that the return address is within the heap, a remedial action is performed that prevents downloading of data by the called downloading function.

Embodiments of the computer program product have a computer-readable storage medium storing executable computer program modules for preventing unauthorized download of data to a computer having a memory heap, the modules comprising a hooking module for hooking one or more downloading functions that can be called by code executing on the computer to download data. The modules further comprise a code checking module for identifying a return address of code executing on the computer that called the hooked downloading function, responsive to a hooked downloading function being called, and determining whether the return address is within the heap. The modules further comprise a remediation module for performing a remedial action that prevents downloading of data by the called downloading function, responsive to the return address being within the heap.

A computer adapted to prevent unauthorized download of data to a computer having a memory heap, comprises a computer readable storage medium storing executable computer program modules. The computer program modules comprise a hooking module for hooking one or more downloading functions that can be called by code executing on the computer to download data. The modules further comprise a code checking module for identifying a return address of code executing on the computer that called the hooked downloading function, responsive to a hooked downloading function being called, and determining whether the return address is within the heap. The modules further comprise a remediation module for performing a remedial action that prevents downloading of data by the called downloading function, responsive to the return address being within the heap.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
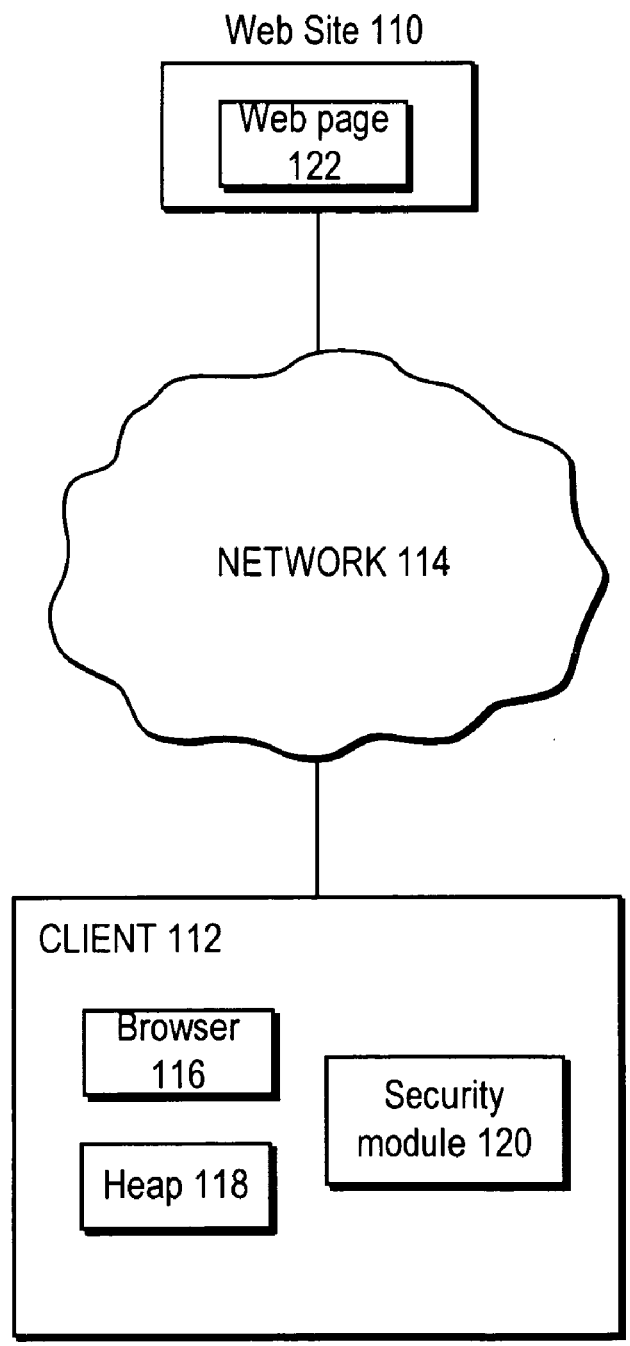
FIG. 1 is a high-level block diagram of a computing environment according to one embodiment.

FIG. 1 is a high-level block diagram of a computing environment 100 according to one embodiment. FIG. 1 illustrates a web site 110 and a client 112 connected by a network 114. Only one client 112 and one web site 110 are shown in FIG. 1 in order to simplify and clarify the description. Embodiments of the computing environment 100 can have thousands or millions of clients 112 and/or web sites 110 connected to the network 114.

In one embodiment, a client 112 is a computer used by one or more users to perform activities including browsing web sites 110 on the network 114. The client 112 executes a web browser 116 such as MICROSOFT INTERNET EXPLORER that allows the user to retrieve and display content from web sites 110 and other computers on the network 114. In other embodiments, the client 112 is a network-capable device other than a computer, such as a personal digital assistant (PDA), a mobile telephone, a pager, a television "set-top box," etc.

The client 112 includes a heap 118. The heap 118 is a memory area that is dynamically allocated to store data for applications executing on the client 112. In one embodiment, the browser 116 uses the heap to store data. In addition, the client 112 includes a security module 120 for monitoring and protecting the client 112. If the security module 120 detects an attempt to attack the client 112, it can perform a remediating action such as blocking the attempt or notifying the user of the attempt.

The web site 110 includes a collection of one or more web pages 122 stored on a web server. The web site 110 is identified by its uniform resource locator (URL). The client 112 uses the URL to download a web page 122 from the site 110 via the network 114.

Assume for purposes of this discussion that the web site 110 is operated by a malicious entity and surreptitiously serves malicious software ("malware"). The web site 110 can be, for example, a legitimate web site that has been compromised by a malicious actor and reconfigured to distribute malware. Alternatively, the web site 110 can be directly operated by a malicious entity but designed to appear legitimate.

The web site 110 distributes the malware by providing a web page 122 that exploits a vulnerability on the client 112 to compromise the client. Since the web page 122 has a size not known a priori, the web browser 116 or other application accessing the web page 122 dynamically allocates memory for it within the heap 118. In one embodiment, the web page 122 includes code, such as JAVASCRIPT code, that "sprays" the heap 118 or another memory area in the client 112 with malicious code by making multiple copies of the code at different locations in the memory area. For example, the code in the web page can allocate a large block of memory, such as an array, within the heap 118 and then cause the client 112 to store specially-crafted content containing malicious instructions therein. Sometimes, the content takes the form of extremely long strings or large images. Portions of the content stored in the heap contain computer-executable instructions for downloading additional malware to the client 112.

After spraying the heap 118, the code in the web page 122 exploits a vulnerability at the client 112 that causes the malicious code sprayed into the heap 118 or other memory area to execute. For example, the code in the web page 122 can exploit a buffer overflow vulnerability in the client's web browser 116, which causes function pointers to be overwritten with the value of an address located in the heap. Since the downloading code has been sprayed throughout the heap 118, there is a high probability that the heap address written into the function pointers will reference the starting address of the downloading code, which will then execute and download additional malware.

In one embodiment, the security module 120 detects when code executing in the heap 118 attempts to download software. In response, the security module 120 blocks the attempted download, notifies the user, and/or performs other remediating actions. Accordingly, the security module 120 protects the client from a heap-spraying based attack.

The network 114 represents the communication pathways between the web site 110 and client 112. In one embodiment, the network 114 is the Internet and uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
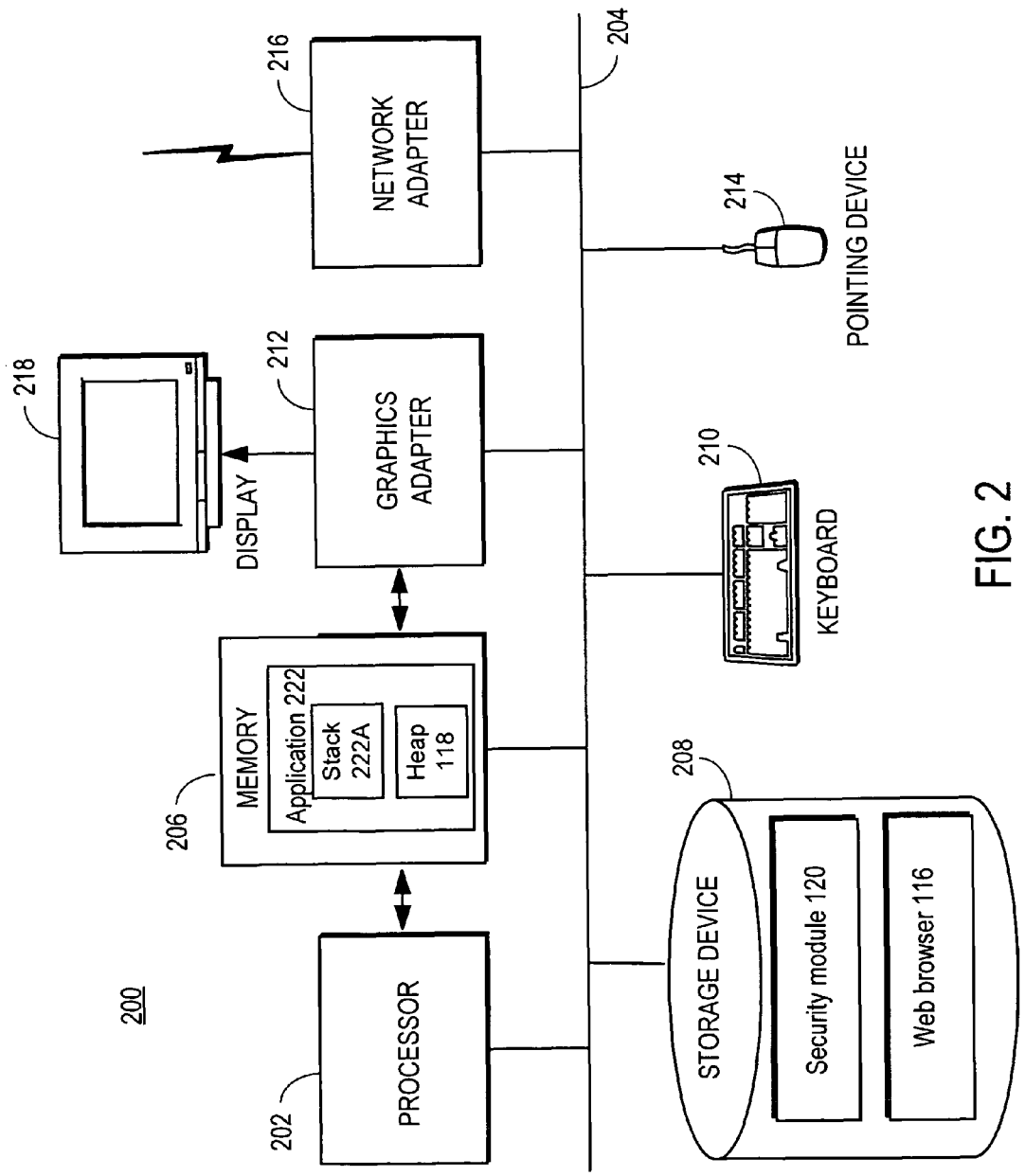
FIG. 2 is a high-level block diagram illustrating a typical computer according to one embodiment.

FIG. 2 is a high-level block diagram illustrating more detailed view of the client 112 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

The memory 206 may be, for example, firmware, read-only memory (ROM), non-volatile random access memory (NVRAM), and/or RAM, and holds instructions and data used by the processor 202. The memory 206 may be divided into pages by the operating system, each page having attributes such as whether the page is readable, writable, or executable (i.e. contains executable instructions), or whether it was loaded from a file on the storage device 208. In one embodiment, the memory 206 includes RAM that holds instructions and data used by the client 112. FIG. 2 depicts an in-memory application 222—such as the web browser 116—that comprises, among other portions, a stack 222A and a heap 118. The stack 222A stores data in a last-in, first-out manner, and is appropriate for tasks such as maintaining the call stack. As noted above, the heap 118 is a region of free memory that is allocated dynamically while an application is being executed. For example, the browser 116 stores web pages, scripts associated with web pages, objects for parsing the web pages, etc., within the heap 118, given that the precise size and number of such objects is not known until runtime and must therefore be assigned dynamically. Note that the heap 118 is not intended to store executable code, and therefore a function call originating from within the heap 118 is an anomalous condition.

The storage device 208 is, in one embodiment, a hard disk drive but can also be any other device capable of storing data, such as a writeable compact disk (CD) or DVD, a solid-state memory device, or other form of computer-readable storage medium. The storage device 208 stores files and other data structures used by the computer. The web browser 116 and security module 120 are illustrated within the storage device 208.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

In addition, this description uses the term "application" to refer to a program executed by the computer 200. Applications include programs such as word processors, web browsers, browser plug-ins and browser helper objects, multimedia editors, email clients, and the like. For purposes of example, the remainder of the discussion below focuses on an embodiment where the application is a web browser 116. However, the application can differ in different embodiments.

Figure 3:
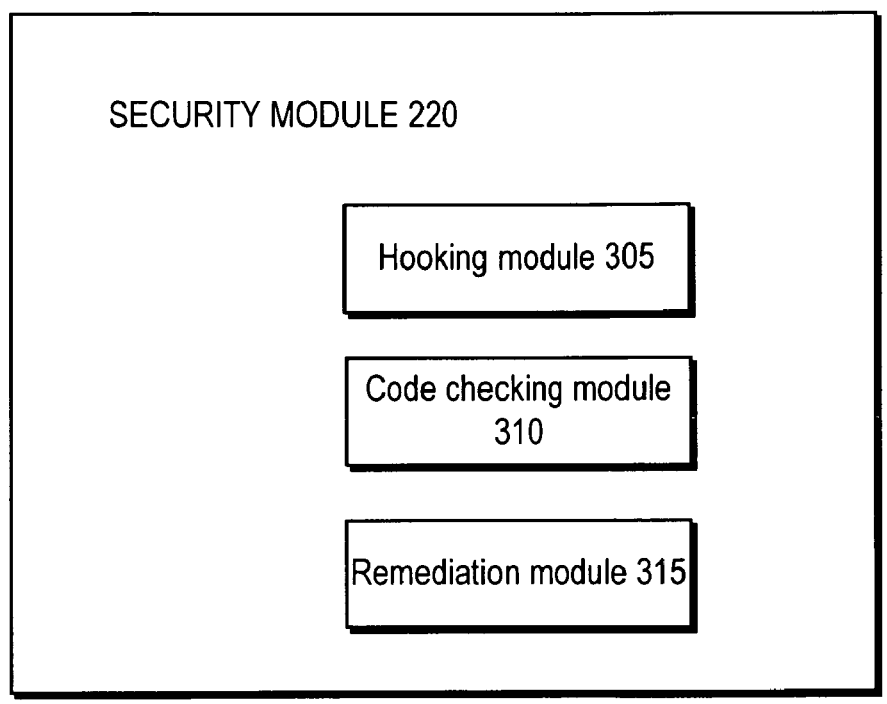
FIG. 3 is a high-level block diagram illustrating a detailed view of the security module of FIG. 1, according to one embodiment.

FIG. 3 is a high-level block diagram illustrating a detailed view of the security module 120 according to one embodiment. Generally, an embodiment of the security module 120 hooks one or more downloading function calls known to be used by malware to perform surreptitious downloads. If a downloading function is called from code executing on the heap 118, the security module 120 recognizes that this function call represents an attempt to compromise the client and performs remediation.

A hooking module 305 hooks function calls likely to be used during an exploit to download malicious software to the client 112. In practice, most malware accomplishes the downloading of the malicious executable using one of a small set of well-known data downloading function calls. For example, on the WINDOWS platform, the malicious code typically uses one of the functions UrlDownloadToFileA, UrlDownloadToFileW, UrlDownloadToCacheFileA, or UrlDownloadToCacheFileW, all of which download data from a given uniform resource locator (URL), storing the data either in a file or in an Internet cache location of the browser application 116. Following the execution of the data downloading function, control is returned to the caller, which in this case is the malicious downloading code allocated on the heap. In one embodiment, the hooking module 305 sets hooks for these functions when the security module 120 is first activated (e.g., at boot time for the client 112). These hooks cause the security module 120 to activate whenever one of these functions is called. At this point, the security module 120 can perform actions such as blocking the action performed by the function call, or allowing the call to proceed normally.

A code-checking module 310 executes when a hooked function is called and determines whether the hooked function was called by code executing on the heap 118. In one embodiment, the code-checking module 310 identifies the return address of the hooked function by examining the stack frame and then determines whether this address is on the heap 118. In one embodiment, the code-checking module 310 determines that the address is on the heap if either the page of memory corresponding to the return address does not have an "executable" attribute set, or the page data was not loaded from a file on the storage device 208. If the return address is not on the heap 118, then the code checking module 310 exits and allows the function call to proceed normally. If the return address is on the heap 118, then this is evidence that an attack on a client 112 is underway because such functions should never be called from the heap 118.

A remediation module 315 takes a remedial action in response to detection of an attack by the code-checking module 310. The remedial actions performed by the remediation module 315 can differ in different embodiments. In one embodiment, the remediation module 315 returns a result code to the caller. This result code can indicate, for example, that the function call failed or that the call was successful. In either case, the attack on the client is prevented because the malware is not downloaded. The remediation module 315 can also perform actions such as terminating the browser, providing an error message to the user and/or an administrator, logging the attack, etc. In a further embodiment, the action may include any or all of these, the precise actions taken being specified via a user policy, e.g. via a preferences setting in software embodying the security module 120.

It is appreciated that the particular apportionment of the functionality of the security module 120 could be differently divided among modules in other embodiments. For example, the functionality of the code checking module 310 and the remediation module 315 might be implemented within a single module.

Figure 4:
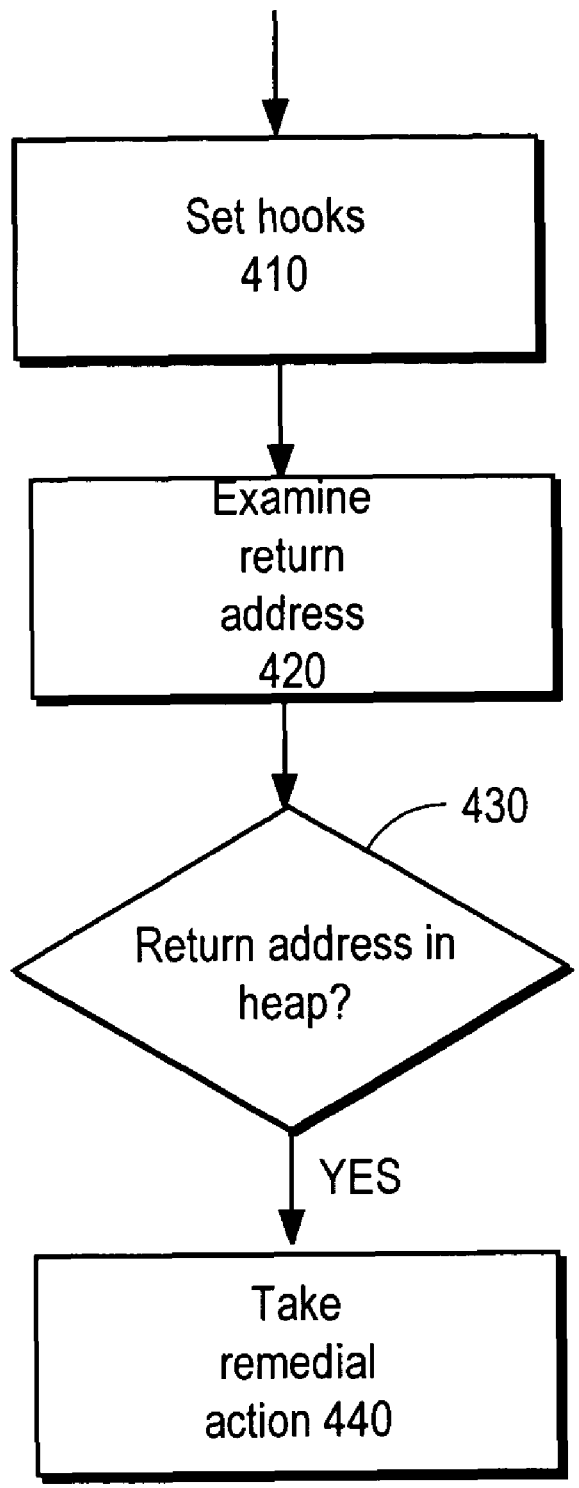
FIG. 4 is a flowchart illustrating steps for using the security module to detect and respond to browser-based malware, according to one embodiment.

FIG. 4 is a flowchart illustrating steps for using the security module to detect and respond to malware attacks, according to one embodiment. At step 410, the hooking module 305 hooks the data downloading functions known to be commonly used by malicious browser-based code, such as functions to download files from a given URL. Specifically, the hooking module 305 sets hooks to cause the code checking module 310 to activate if the functions are called. In one embodiment, such hooking is performed at the time that the security module 120 is first executed, e.g. at system startup of the computer 200.

At step 420, assume that one of the hooked functions is called. As a result, control transfers to the code-checking module 310. This module 310 proceeds to examine the return address of the caller, to which control would normally return after the completion of the hooked function.

At step 430, the code-checking module 310 branches based on the value of the return address. If the return address specifies a location outside the heap, then the code-checking module 310 transfers control back to the well-known function. If, however, the return address specifies a location within the heap, then the calling code is deemed to be malicious. In such a case, the method proceeds to step 440, in which the remediation module 315 takes a remedial action, such as returning an error code, terminating the web browser 116, and/or displaying a message, thereby preventing the malicious code from causing harm.

Note that this approach focuses on the behavior of the malware, such as heap code calling a function downloading a file. Thus, all malware having this same general behavior—in practice, a large class—can be detected without the use of signatures.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of preventing unauthorized download of data to a computer having a web browser process comprising a memory heap, comprising:
    hooking one or more downloading functions that can be called by code executing on the computer to download data;
    responsive to a hooked downloading function being called by code stored in the memory heap of the web browser process, identifying a return address of the code;
    determining whether the return address is within the heap based at least in part on whether data of a page of memory corresponding to the return address were loaded from a file; and
    responsive to the return address being within the heap, performing a remedial action that prevents downloading of data by the called downloading function.

2. The method of claim 1, wherein the hooked downloading functions include a function from the group of UrlDownloadToFileA, UrlDownloadToFileW, UrlDownloadToCacheFileA, and UrlDownloadToCacheFileW.

3. The method of claim 1, wherein the code is downloaded over a network.

4. The method of claim 1, wherein the remedial action comprises returning an error code to the code that called the hooked downloading function.

5. The method of claim 1, wherein the remedial action comprises displaying an alert.

6. A computer program product having a non-transitory computer-readable storage medium storing executable computer program modules for preventing unauthorized download of data to a computer having a web browser process comprising a memory heap, the modules comprising:
- a hooking module for hooking one or more downloading functions that can be called by code executing on the computer to download data;
- a code checking module for:
  - identifying a return address of code stored in the memory heap of the web browser process, responsive to the code calling one of the hooked downloading functions, and
  - determining whether the return address is within the heap based at least in part on whether data of a page of memory corresponding to the return address were loaded from a file; and
- a remediation module for performing a remedial action that prevents downloading of data by the called downloading function, responsive to the return address being within the heap.

7. The computer program product of claim 6, wherein the hooked downloading functions include a function from the group of UrlDownloadToFileA, UrlDownloadToFileW, UrlDownloadToCacheFileA, and UrlDownloadToCacheFileW.

8. The computer program product of claim 6, wherein the code is downloaded over a network.

9. The computer program product of claim 6, wherein the remedial action comprises returning an error code to the code that called the hooked downloading function.

10. The computer program product of claim 6, wherein the remedial action comprises displaying an alert.

11. A computer adapted to prevent unauthorized download of data to a computer having a web browser process comprising a memory heap, comprising:
- a computer-readable storage medium storing executable computer program modules comprising:
- a hooking module for hooking one or more downloading functions that can be called by code executing on the computer to download data;
- a code checking module for:
  - identifying a return address of code stored in the memory heap of the web browser process, responsive to the code calling one of the hooked downloading functions, and
  - determining whether the return address is within the heap based at least in part on whether data of a page of memory corresponding to the return address were loaded from a file; and
- a remediation module for performing a remedial action that prevents downloading of data by the called downloading function, responsive to the return address being within the heap.

12. The computer of claim 11, wherein the hooked downloading functions include a function from the group of UrlDownloadToFileA, UrlDownloadToFileW, UrlDownloadToCacheFileA, and UrlDownloadToCacheFileW.

13. The computer of claim 11, wherein the code is downloaded over a network.

14. The computer of claim 11, wherein the remedial action comprises returning an error code to the code that called the hooked downloading function.

15. The computer of claim 11, wherein the remedial action comprises displaying an alert.

\* \* \* \* \*